United States Patent
Sakurai et al.

(10) Patent No.: US 7,243,881 B2
(45) Date of Patent: Jul. 17, 2007

(54) MULTI-FUNCTION TRAILING EDGE DEVICES AND ASSOCIATED METHODS

(75) Inventors: Seiya Sakurai, Seattle, WA (US);
Stephen J. Fox, Seattle, WA (US);
Kevin W. Beyer, Seattle, WA (US);
Douglas S. Lacy, Seattle, WA (US);
Paul L. Johnson, Seattle, WA (US);
Stephen L. Wells, Seattle, WA (US);
Jack S. Noble, Shoreline, WA (US);
Paul T. Meredith, Seattle, WA (US);
Neal V. Huynh, Seattle, WA (US);
Russell R. Christianson, Seattle, WA (US); Paul M. Vijgen, Seattle, WA (US); Michael F. Fitzpatrick, Seattle, WA (US); Clayton A. Prow, Seattle, WA (US); Edward W. Gronenthal, Seattle, WA (US)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 10/860,438

(22) Filed: Jun. 3, 2004

(65) Prior Publication Data

US 2005/0011994 A1 Jan. 20, 2005

Related U.S. Application Data

(60) Provisional application No. 60/475,828, filed on Jun. 3, 2003.

(51) Int. Cl.
*B64C 9/22* (2006.01)
(52) U.S. Cl. ...................................................... 244/212
(58) Field of Classification Search .............. 244/35 R, 244/38, 39, 198, 201, 206, 211–213, 215, 244/45 R
See application file for complete search history.

(56) References Cited

U.S. PATENT DOCUMENTS 1,724,456 A 8/1929 Crook (Continued)

FOREIGN PATENT DOCUMENTS

DE 387833 1/1924

(Continued)

OTHER PUBLICATIONS

"Adaptive Aircraft: No Flight of Fancy?" Research into using exotic means of making wings change shpe in-flight looks promising, though still a long way from reality, Business Week Online, Jan. 7, 2003, pp. 1-3.

(Continued)

*Primary Examiner*—Teri Pham Luu
*Assistant Examiner*—Stephen A Holzen
(74) *Attorney, Agent, or Firm*—Perkins Coie LLP

(57) ABSTRACT

Trailing edge devices configured to carry out multiple functions, and associated methods of use and manufacture are disclosed. An external fluid flow body (e.g., an airfoil) configured in accordance with an embodiment of the invention includes a first portion and a second portion, at least a part of the second portion being positioned aft of the first portion, with the second portion being movable relative to the first portion between a neutral position, a plurality of upward positions, and a plurality of downward positions. A guide structure can be coupled between the first and second portions, and an actuator can be operatively coupled between the first and second portions to move the second portion relative to the first portion. In one embodiment, a flexible surface can track the motion of the second portion and can expose a gap at some positions. In another embodiment, a controller can be coupled to the actuator and can be configured to direct the actuator to move the second portion to a high lift setting, a high drag setting, a roll setting, and a trim setting. In yet another embodiment, trailing edge devices on an airfoil can have scaled, mechanically similar guide structures.

14 Claims, 10 Drawing Sheets

U.S. PATENT DOCUMENTS

| | | |
|---|---|---|
| 1,770,575 A | 7/1930 | Ksoll |
| 2,086,085 A | 7/1937 | Lachmann et al. |
| 2,169,416 A | 8/1939 | Griswold |
| 2,282,516 A * | 5/1942 | Gropler et al. ............. 244/216 |
| 2,289,704 A * | 7/1942 | Grant ......................... 244/225 |
| 2,319,383 A * | 5/1943 | Zap ........................... 244/90 R |
| 2,347,230 A | 4/1944 | Zuck |
| 2,358,985 A | 9/1944 | McAndrew |
| 2,378,528 A | 6/1945 | Arsandaux |
| 2,383,102 A * | 8/1945 | Zap ........................... 244/90 R |
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | James et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Lawrence et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A | 8/1965 | Hoover |
| 3,203,647 A | 8/1965 | Alvarez-Calderon |
| 3,282,535 A | 11/1966 | Steiner |
| 3,375,998 A | 4/1968 | Alvarez-Calderon |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A * | 7/1972 | Schwarzler ................ 244/212 |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A * | 4/1976 | Portier ....................... 244/210 |
| 3,968,946 A | 7/1976 | Cole |
| 3,985,319 A | 10/1976 | Dean et al. |
| 3,987,983 A | 10/1976 | Cole |
| 3,992,979 A | 11/1976 | Smith |
| 3,993,584 A | 11/1976 | Owen et al. |
| 3,994,451 A | 11/1976 | Cole |
| 4,015,787 A * | 4/1977 | Maieli et al. ................ 244/215 |
| 4,106,730 A | 8/1978 | Spitzer et al. |
| 4,117,996 A | 10/1978 | Sherman |
| 4,120,470 A * | 10/1978 | Whitener .................... 244/213 |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A * | 1/1980 | Moelter et al. ............. 244/213 |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,262,868 A | 4/1981 | Dean |
| 4,267,990 A | 5/1981 | Staudacher |
| 4,275,942 A | 6/1981 | Steidl |
| 4,283,029 A * | 8/1981 | Rudolph ..................... 244/215 |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly |
| 4,427,168 A | 1/1984 | Mc Kinney |
| 4,441,675 A | 4/1984 | Boehringer |
| 4,444,368 A * | 4/1984 | Andrews .................... 244/216 |
| 4,461,449 A | 7/1984 | Turner |
| 4,471,925 A | 9/1984 | Kunz |
| 4,471,927 A * | 9/1984 | Rudolph et al. ............ 244/215 |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,637,573 A | 1/1987 | Perin |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |

| | | | | | | |
|---|---|---|---|---|---|---|
| 4,747,375 A | 5/1988 | Williams | | 6,173,924 B1 | 1/2001 | Young et al. |
| 4,784,355 A | 11/1988 | Brine | | 6,189,837 B1 | 2/2001 | Matthews |
| 4,786,013 A | 11/1988 | Pohl | | 6,213,433 B1 | 4/2001 | Gruensfelder |
| 4,789,119 A | 12/1988 | Bellego et al. | | 6,227,498 B1 * | 5/2001 | Arata .................. 244/219 |
| 4,796,192 A | 1/1989 | Lewis | | 6,244,542 B1 * | 6/2001 | Young et al. ........... 244/213 |
| 4,823,836 A | 4/1989 | Bachmann et al. | | 6,293,497 B1 | 9/2001 | Kelley-Wickemeyer |
| 4,838,503 A | 6/1989 | Williams et al. | | 6,328,265 B1 * | 12/2001 | Dizdarevic .............. 244/213 |
| 4,854,528 A | 8/1989 | Hofrichter et al. | | 6,349,798 B1 | 2/2002 | McKay |
| 4,856,735 A | 8/1989 | Lotz | | 6,364,254 B1 | 4/2002 | May |
| 4,867,394 A | 9/1989 | Patterson, Jr. | | 6,375,126 B1 | 4/2002 | Sakurai |
| 4,892,274 A | 1/1990 | Pohl et al. | | 6,382,566 B1 | 5/2002 | Ferrel et al. |
| 4,899,284 A | 2/1990 | Lewis et al. | | 6,431,498 B1 | 8/2002 | Watts et al. |
| 4,962,902 A * | 10/1990 | Fortes .................. 244/215 | | 6,439,512 B1 | 8/2002 | Hart |
| 5,039,032 A | 8/1991 | Rudolph | | 6,443,394 B1 | 9/2002 | Weisend |
| 5,046,688 A | 9/1991 | Woods | | 6,450,457 B1 | 9/2002 | Sharp |
| 5,050,081 A | 9/1991 | Abbott et al. | | 6,464,175 B2 | 10/2002 | Yada et al. |
| 5,056,741 A | 10/1991 | Bliesner et al. | | 6,466,141 B1 | 10/2002 | McKay et al. |
| 5,074,495 A | 12/1991 | Raymond | | 6,478,541 B1 | 11/2002 | Charles et al. |
| 5,082,207 A | 1/1992 | Tulinius | | 6,481,667 B1 * | 11/2002 | Ho .................. 244/99.11 |
| 5,082,208 A | 1/1992 | Matich | | 6,484,969 B2 | 11/2002 | Sprenger |
| 5,088,665 A | 2/1992 | Vijgen et al. | | 6,499,577 B2 | 12/2002 | Kitamoto et al. |
| 5,094,411 A | 3/1992 | Rao | | 6,536,714 B2 | 3/2003 | Gleine |
| 5,094,412 A | 3/1992 | Narramore | | 6,547,183 B2 | 4/2003 | Farnsworth |
| 5,100,082 A | 3/1992 | Archung | | 6,554,229 B1 | 4/2003 | Lam |
| 5,114,100 A | 5/1992 | Rudolph et al. | | 6,561,463 B1 | 5/2003 | Todd et al. |
| 5,129,597 A | 7/1992 | Manthey et al. | | 6,591,169 B2 | 7/2003 | Jones |
| 5,158,252 A | 10/1992 | Sakurai | | 6,598,829 B2 | 7/2003 | Kamstra |
| 5,167,383 A | 12/1992 | Nozaki | | 6,598,834 B2 | 7/2003 | Nettle et al. |
| 5,203,619 A | 4/1993 | Welsch et al. | | 6,601,801 B1 * | 8/2003 | Prow et al. ............. 244/216 |
| 5,207,400 A | 5/1993 | Jennings | | 6,622,972 B2 | 9/2003 | Urnes |
| 5,244,269 A | 9/1993 | Harriehausen et al. | | 6,622,974 B1 | 9/2003 | Dockter et al. |
| 5,259,293 A | 11/1993 | Brunner | | 6,625,982 B2 | 9/2003 | Van Den Bossche |
| 5,280,863 A | 1/1994 | Schmittle | | 6,644,599 B2 | 11/2003 | Perez |
| 5,282,591 A | 2/1994 | Walters et al. | | 6,651,930 B1 | 11/2003 | Gautier et al. |
| 5,351,914 A | 10/1994 | Nagao et al. | | 6,729,583 B2 * | 5/2004 | Milliere ................ 244/213 |
| 5,388,788 A * | 2/1995 | Rudolph .................. 244/215 | | 6,745,113 B2 | 6/2004 | Griffin, III et al. |
| 5,420,582 A | 5/1995 | Kubbat et al. | | 6,755,375 B2 | 6/2004 | Trikha |
| 5,441,218 A | 8/1995 | Mueller et al. | | 6,796,526 B2 | 9/2004 | Boehringer |
| 5,474,265 A | 12/1995 | Capbern | | 6,796,534 B2 | 9/2004 | Beyer et al. |
| 5,493,497 A | 2/1996 | Buus | | 6,799,739 B1 | 10/2004 | Jones |
| 5,535,852 A | 7/1996 | Bishop et al. | | 6,802,475 B2 | 10/2004 | Davies et al. |
| 5,542,684 A | 8/1996 | Squirrell | | 6,824,099 B1 | 11/2004 | Jones |
| 5,544,847 A | 8/1996 | Bliesner | | 6,843,452 B1 | 1/2005 | Vassberg et al. |
| 5,600,220 A | 2/1997 | Thoraval et al. | | 6,860,452 B2 | 3/2005 | Bacon et al. |
| 5,609,020 A | 3/1997 | Jackson et al. | | 6,870,490 B2 | 3/2005 | Sherry et al. |
| 5,680,124 A | 10/1997 | Bedell et al. | | 6,978,971 B1 | 12/2005 | Dun |
| 5,681,014 A | 10/1997 | Davies et al. | | 6,981,676 B2 | 1/2006 | Milliere |
| 5,686,907 A | 11/1997 | Bedell et al. | | 7,048,234 B2 | 5/2006 | Reeksiek et al. |
| 5,735,485 A * | 4/1998 | Ciprian et al. ............. 244/113 | | 7,051,982 B1 * | 5/2006 | Johnson ................ 244/215 |
| 5,740,991 A | 4/1998 | Gleine et al. | | 7,059,563 B2 * | 6/2006 | Huynh ................. 244/226 |
| 5,743,490 A | 4/1998 | Gillingham et al. | | 2001/0006207 A1 * | 7/2001 | Caton et al. ............. 244/213 |
| 5,788,190 A * | 8/1998 | Siers .................. 244/212 | | 2003/0058134 A1 | 3/2003 | Sherry et al. |
| 5,839,698 A * | 11/1998 | Moppert .................. 244/217 | | 2003/0127569 A1 | 7/2003 | Bacon et al. |
| 5,875,998 A | 3/1999 | Gleine et al. | | 2003/0132860 A1 | 7/2003 | Feyereisen et al. |
| 5,915,653 A * | 6/1999 | Koppelman ............. 244/129.1 | | 2003/0197097 A1 * | 10/2003 | Wakayama ............. 244/215 |
| 5,921,506 A | 7/1999 | Appa | | 2003/0230677 A1 * | 12/2003 | Milliere ................ 244/213 |
| 5,927,656 A | 7/1999 | Hinkleman | | 2004/0004162 A1 | 1/2004 | Beyer |
| 5,934,615 A | 8/1999 | Treichler | | 2004/0059474 A1 | 3/2004 | Boorman et al. |
| 5,978,715 A | 11/1999 | Briffe et al. | | 2004/0195464 A1 | 10/2004 | Vassberg et al. |
| 5,984,230 A | 11/1999 | Drazi | | 2004/0245386 A1 | 12/2004 | Huynh |
| 6,015,117 A | 1/2000 | Broadbent | | 2005/0011994 A1 * | 1/2005 | Sakurai et al. ........... 244/212 |
| 6,033,180 A | 3/2000 | Machida | | 2005/0017126 A1 | 1/2005 | McLean et al. |
| 6,045,204 A | 4/2000 | Frazier et al. | | 2005/0045765 A1 | 3/2005 | Pitt |
| 6,073,624 A | 6/2000 | Laurent | | 2005/0061922 A1 | 3/2005 | Milliere |
| 6,076,767 A | 6/2000 | Farley et al. | | 2005/0109876 A1 | 5/2005 | Speer |
| 6,076,776 A | 6/2000 | Breitbach et al. | | 2005/0171652 A1 | 8/2005 | Speer |
| 6,079,672 A | 6/2000 | Lam et al. | | 2005/0203676 A1 | 9/2005 | Sandell et al. |
| 6,082,679 A | 7/2000 | Crouch et al. | | 2005/0222721 A1 | 10/2005 | Chen et al. |
| 6,109,567 A | 8/2000 | Munoz | | 2005/0224662 A1 | 10/2005 | Lacy |
| 6,145,791 A | 11/2000 | Diller et al. | | 2005/0228674 A1 | 10/2005 | Gunn et al. |
| 6,152,405 A * | 11/2000 | Muller ................. 244/219 | | 2005/0231390 A1 | 10/2005 | Crane et al. |
| 6,161,801 A | 12/2000 | Kelm | | 2005/0242234 A1 * | 11/2005 | Mahmulyin ............. 244/75.1 |
| 6,164,598 A | 12/2000 | Young et al. | | 2005/0274847 A1 | 12/2005 | Charron |

| | | | |
|---|---|---|---|
| 2006/0000952 | A1 | 1/2006 | Speer |
| 2006/0038086 | A1 | 2/2006 | Reckzeh |
| 2006/0049308 | A1 | 3/2006 | Speer |
| 2006/0102803 | A1 | 5/2006 | Speer |
| 2006/0169874 | A1 | 8/2006 | Speer |
| 2006/0175468 | A1 | 8/2006 | Speer |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 483 504 | 5/1992 |
| EP | 0 781 704 | 7/1997 |
| EP | 0 947 421 | 10/1999 |
| EP | 1010616 | 6/2000 |
| EP | 1338506 | 8/2003 |
| EP | 1 547 917 | 6/2005 |
| FR | 705155 | 6/1931 |
| FR | 984 443 | 7/1951 |
| FR | 56 121 | 9/1952 |
| FR | 57 988 | 9/1953 |
| FR | 58273 | 11/1953 |
| GB | 1 181 991 | 2/1970 |
| GB | 2 144 688 A | 3/1985 |

OTHER PUBLICATIONS

"Aero-Space Research & Technology," Space Systems, Sep. 1, 2001, pp. 1-28.
"Morphing aircraft Structure,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
www.crgrp.net, "Morphing Aerostructure—an Overview," pp. 1-9.
U.S. Appl. No. 60/475,828, Whitener.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Tailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Flap Drive System, 777 Maintenance Manual, Publication Date: Circa 1994 ( 1 page).
Flap Transmission and Support, 777 Maintenance Manual, Publication Date: Circe 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16;Accessed Aug. 7, 2003)
Moog, Component Maintenance Manual, May 1994 (2 pgs).
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical"Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeornautics and Space Administration, Aug. 1974 (pp. 8-18).
Drela, M., "Design and Optimization Method for Multi-Element Airfoils", American Institute of Aeronautics and Astronautics, Inc., 1993, 11 pgs.
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
"Morphing Aircraft Structures,"—Penn State University, www.personal.psu.edu/users/d/s/dsr134/mas/Cellular.htm, pp. 1-3.
"Morphing Aircraft Structures,"—Raytheon, www.defense-update.com, pp. 1-3.
www.crgrp.net, "Morphing Aerostructure—an Overview," 7 pgs; accessed Aug. 31, 2005.
Leaf Spring Retainer Seals; EMP, Inc.; 2 pgs (date unknown).
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28Aircraft%29&oldid=67413665>.
"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.

* cited by examiner

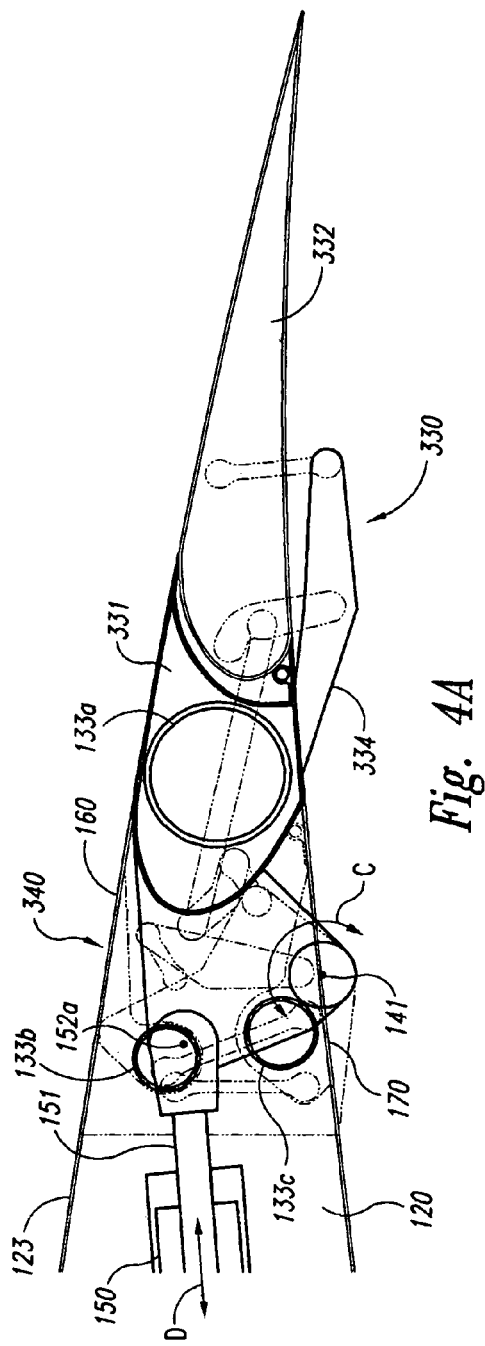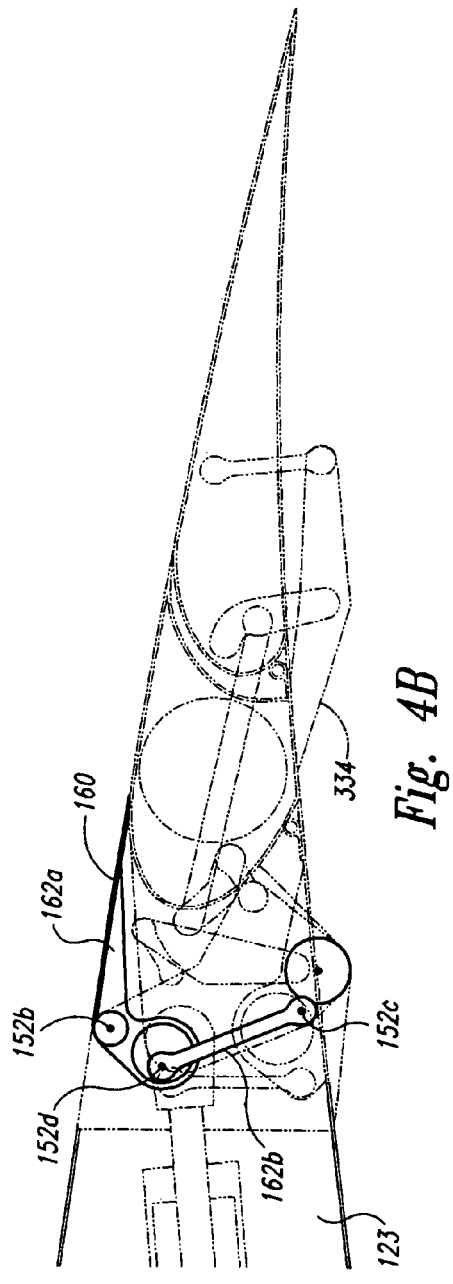
Fig. 4A
Fig. 4B

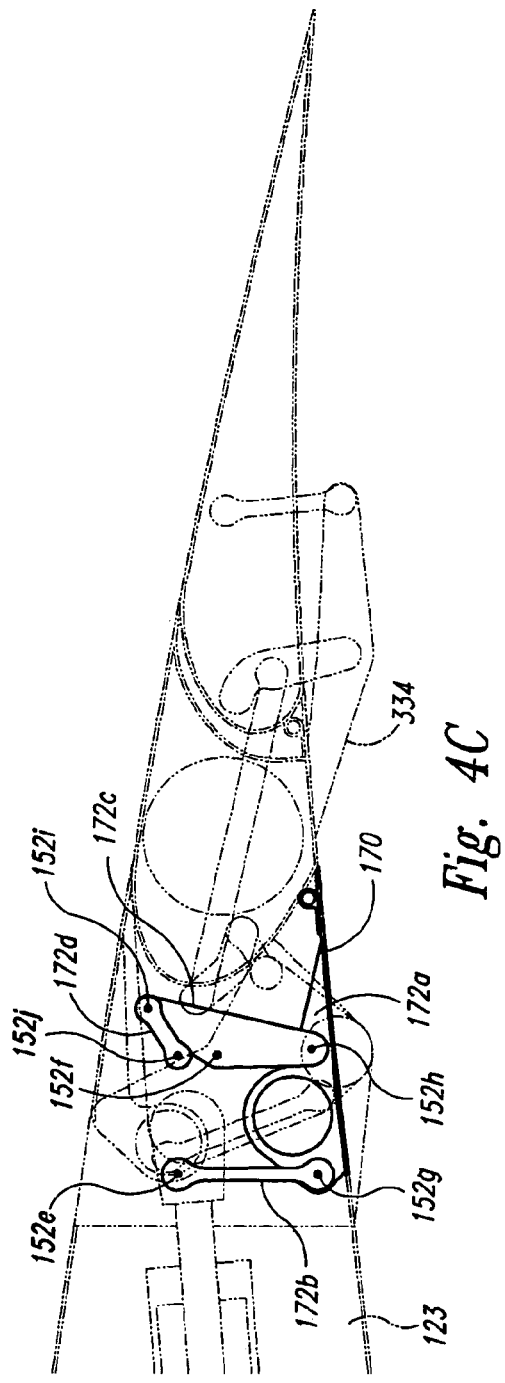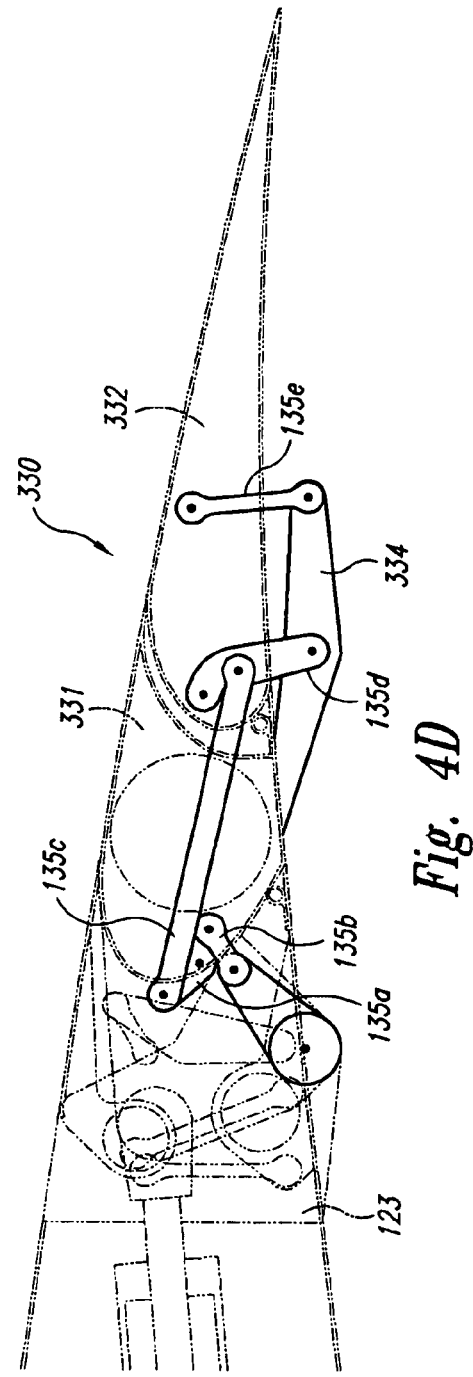
Fig. 4C
Fig. 4D

MULTI-FUNCTION TRAILING EDGE DEVICES AND ASSOCIATED METHODS

CROSS-REFERENCE TO RELATED APPLICATION

The present application claims priority to pending U.S. Provisional Application No. 60/475,828, filed Jun. 3, 2003 and incorporated herein in its entirety by reference.

TECHNICAL FIELD

The present invention relates generally to multi-function and/or mechanically similar trailing edge devices and associated methods of manufacture and use.

BACKGROUND

Modern high speed, subsonic commercial aircraft typically have wings with a variety of leading edge and trailing edge devices to change the shape of the wings as the flight conditions change. For example, as shown in FIG. 1, an existing wing 10 includes a leading edge portion 20 having a plurality of trailing edge devices 5. The trailing edge devices 5 can include an aileron 6 for roll control at low speed, two flaps 8 for increased lift at low speed, a "flaperon" 7, which can act as a flap at low speed and an aileron at high speed, and two spoiler assemblies 9 for increasing drag and/or inhibiting lift during flight and/or after landing.

One potential drawback with the foregoing arrangement is that each different type of trailing edge device is generally configured in a different, function-specific manner. Accordingly, each wing generally includes a multitude of trailing edge devices having different mechanical arrangements, different actuator arrangements, different functions and different flight capabilities. These differences can lead to increased costs for manufacturing and maintaining the wing 10, and can increase the overall weight of the aircraft.

SUMMARY

The present invention is generally directed toward multi-function and/or mechanically similar trailing edge devices. A system in accordance with one aspect of the invention includes a first portion of an external fluid flow body having a first flow surface and a second flow surface facing opposite from the first flow surface. A second portion of the body can be movable relative to the first portion and can have at least one part positioned aft of the first portion. The second portion can be movable between a neutral position with the second portion generally aligned with the first portion, a plurality of first positions with the second portion deflected in a first direction relative to the neutral position, and a plurality of second positions, with the second portion deflected in a second direction opposite the first direction relative to the neutral position. A flexible surface can be positioned proximate to the first and second portions, and can have a first shape when the second portion is in the neutral position, a second shape when the second portion is in at least one of the first positions, and a third shape when the second portion is in at least one of the second positions. An actuator can be coupled between the first and second portions to move the second portion relative to the first portion, and a guide structure can guide the motion of the second portion. In a particular aspect of the invention, a controller can be coupled to the actuator and can be configured to direct the actuator to move the second portion to a high lift setting, a high drag setting, a roll setting, and a trim setting.

In another aspect of the invention, an aircraft system can include first and second trailing edge portions positioned aft of a leading edge portion. A first guide structure having a first mechanical arrangement can be coupled between the leading edge portion and the first trailing edge portion, and a second guide structure having a second mechanical arrangement can be coupled between the leading edge portion and the second trailing edge portion. The second mechanical arrangement can be generally similar to and scaled relative to the first mechanical arrangement.

A method for controlling an aircraft in accordance with another aspect of the invention includes increasing a lift of the aircraft by directing a trailing edge portion of an airfoil to move relative to a leading edge portion of the airfoil from a neutral position to a high lift position. The method can further include increasing a drag of the aircraft by directing the trailing edge portion to move relative to the leading edge portion from the neutral position to a high drag position, rolling the aircraft by directing the trailing edge portion to move relative to the leading edge portion from the neutral position to a roll position, and distributing the lift of the aircraft by directing the trailing edge portion to move relative to the leading edge portion from the neutral position to a trim position.

BRIEF DESCRIPTION OF THE DRAWINGS

FIGS. 4A-4D illustrate aspects of a guide structure for controlling the movement of a trailing edge portion in accordance with an embodiment of the invention.

DETAILED DESCRIPTION

The present disclosure describes airfoils having multi-function and/or mechanically similar trailing edge devices, and methods for operating and manufacturing such airfoils. Many specific details of certain embodiments of the invention are set forth in the following description and in FIGS. 2A-8C to provide a thorough understanding of these embodiments. One skilled in the art, however, will understand that the present invention may have additional embodiments, and that the invention may be practiced without several of the details described below.

Figure 1:
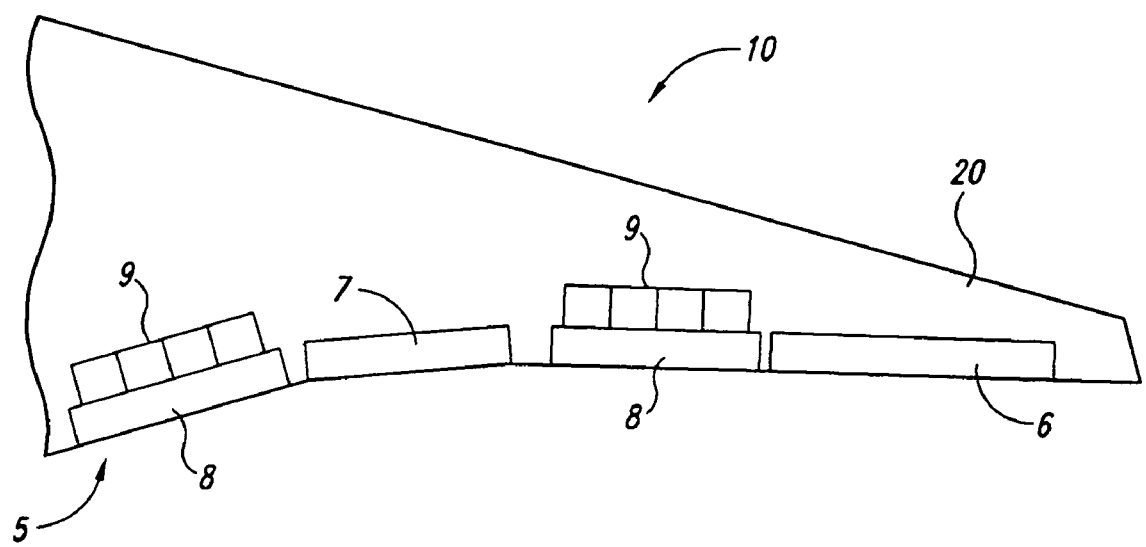
FIG. 1 is a partially schematic, top plan view of an airfoil configured in accordance with the prior art.
Figure 2A:
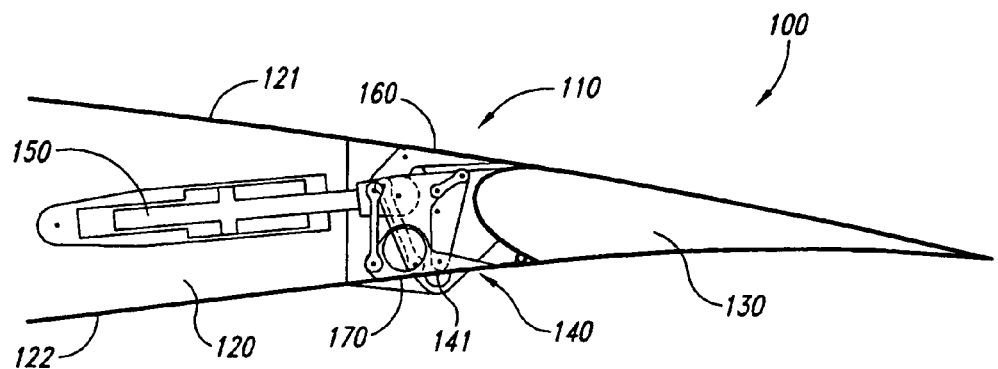
FIGS. 2A-2F illustrate partially schematic, cross-sectional views of an airfoil having a trailing edge portion configured in accordance with an embodiment of the invention.

FIG. 2A is a partially schematic, cross-sectional illustration of an aircraft system 100 that includes an airfoil 110 or other external fluid flow body configured in accordance with an embodiment of the invention. For purposes of illustration, only the aft portion of the airfoil 110 is shown in FIG. 2A. The airfoil 110 can have a first or upper flow surface 121 and a second or lower flow surface 122. A first or forward portion 120 of the airfoil 110 includes the airfoil leading edge (not shown in FIG. 2A). The airfoil 110 can further include a second or aft portion 130 (e.g., a trailing edge device), at least part of which is positioned aft of the first portion 120. An actuator 150 can move the second portion 130 relative to the first portion 120, away from a neutral position shown in FIG. 2A.

The motion of the second portion 130 relative to the first portion 120 can be controlled by a guide structure 140. The guide structure 140 can be coupled to an upper cove panel 160 and a lower cove panel 170. When the second portion 130 is in the neutral position, the upper cove panel 160 can provide for a generally smooth, continuous upper flow surface 121 from the first portion 120 to the second portion 130, and the lower cove panel 170 can provide for a generally smooth, continuous lower flow surface 122.

In one aspect of this embodiment, the second portion 130 pivots about a hinge line 141 relative to the first portion 120. In a further aspect of this embodiment, the hinge line 141 can be positioned at or close to the lower flow surface 122 of the airfoil 110. In another embodiment, the hinge line 141 can be positioned between the lower flow surface 122 and the upper flow surface 121. In either embodiment, the second portion 130 can pivot upwardly and downwardly relative to the first portion 120 about the hinge line 141, as described in greater detail below with reference to FIGS. 2B-2F.

Figure 2B:
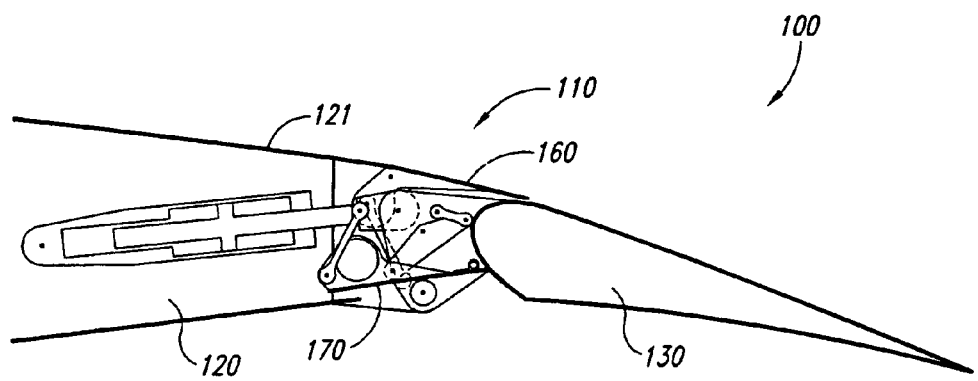

Referring now to FIG. 2B, the second portion 130 can be deployed downwardly by a relatively small amount (e.g., about 5 degrees, or about 10 degrees as shown in FIG. 2B) to change the lift characteristics of the airfoil 110. As the second portion 130 deploys downwardly relative to the first portion 120, the upper cove panel 160 can follow the second portion 130 to maintain a sealed (e.g., completely sealed) relatively continuous upper flow surface 121. The lower cove panel 170 can also move to at least partially cover a gap that would otherwise form between the second portion 130 and the first portion 120 as the second portion 130 moves.

When the second portion 130 is deployed downwardly by a relatively small amount (e.g., about 10 degrees or less, or in a particular embodiment, about 5 degrees or less), it can provide several functions for the aircraft system 100. For example, the second portion 130 can provide aileron functionality to control the lift of the airfoil 110. When combined with an opposite deflection of a second portion 130 on an opposite side of the aircraft system 100, the second portions 130 can roll the aircraft system 100. Accordingly, the second portion 130 can move relatively quickly to the position shown in FIG. 2B to provide for quick roll response. In another embodiment, the second portion 130 can deploy to the position shown in FIG. 2B to trim the airfoil 110 and/or control the spanwise lift distribution across the airfoil 110. In many cases, the foregoing functions are provided by moving a plurality of second portions 130 in a coordinated manner, as described in greater detail below with reference to FIGS. 5-7.

Figure 2C:
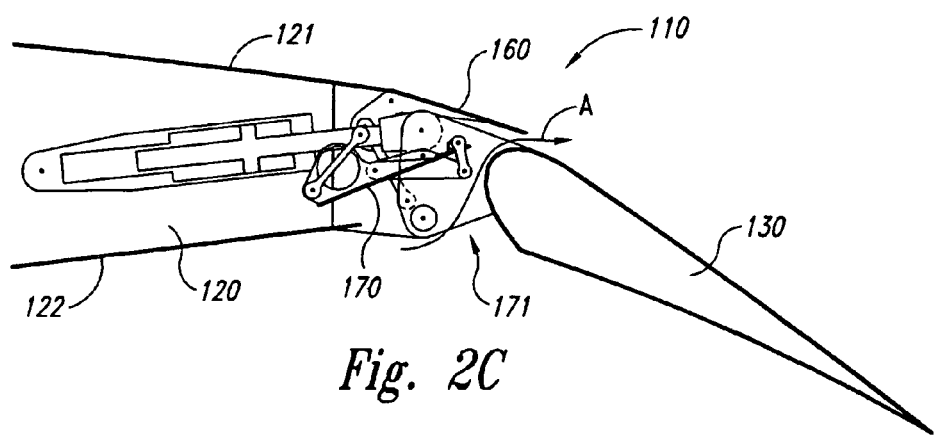
Figure 2D:
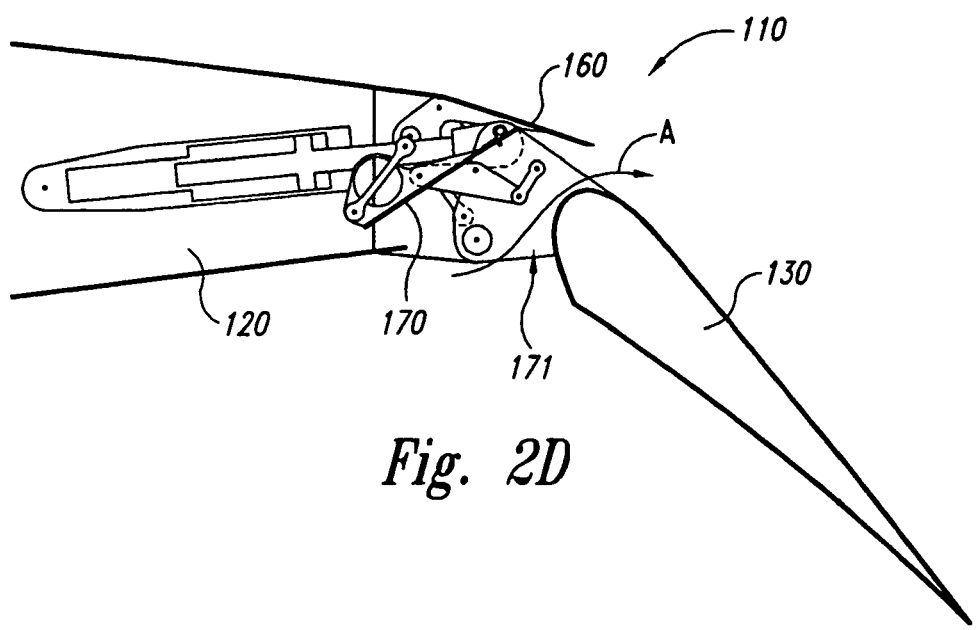

Referring now to FIG. 2C, the second portion 130 can be further deployed downwardly to provide a flap or high lift function. In a particular embodiment, the second portion 130 can be deployed downwardly to about 25 degrees to provide for high lift during landing approach. In this configuration, the lower cove panel 170 can move upwardly away from the lower flow surface 122, and the upper cove panel 160 can cease to contact the second portion 130, thereby exposing a gap 171 between the second portion 130 and the first portion 120. Accordingly, a portion of the airflow traveling along the lower flow surface 122 can pass through the gap 171, as indicated by arrow A. This slotted flap arrangement can provide for increased lift of the airfoil 110 and can smooth the airflow over the second portion 130 even at relatively high deployment angles. As shown in FIG. 2D, this arrangement can be maintained at higher deployment angles, for example, about 40 degrees of downward deflection.

Figure 2E:
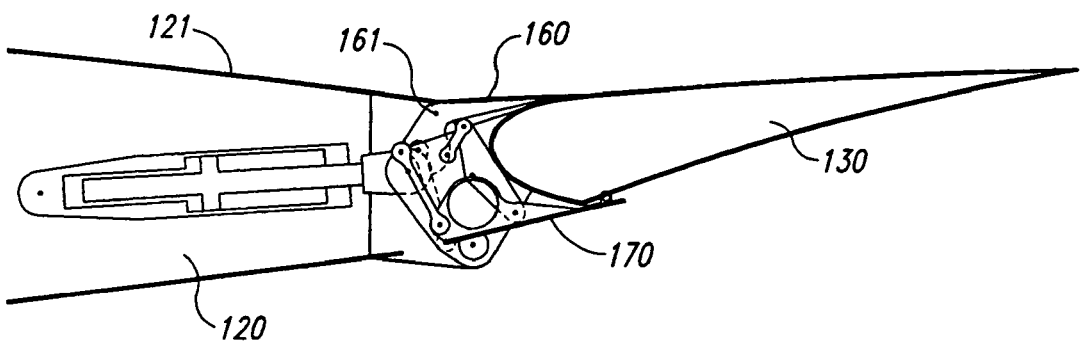

The second portion 130 can also be deployed upwardly relative to the neutral position shown in FIG. 2A. For example, as shown in FIG. 2E, the second portion 130 can be deployed upwardly by about 15 degrees. In this position, the second portion 130 can provide roll control and/or trim functions and/or control of spanwise lift distribution. In one aspect of this embodiment, the lower cove panel 170 can move with the second portion 130 to close at least a portion of the gap that would otherwise form between the second portion 130 and the first portion 120. The upper cove panel 160 can pivot about an upper hinge line 161 to maintain contact with the second portion 130 and seal the gap that would otherwise form between the second portion 130 and the first portion 120 at the upper flow surface 121.

Figure 2F:
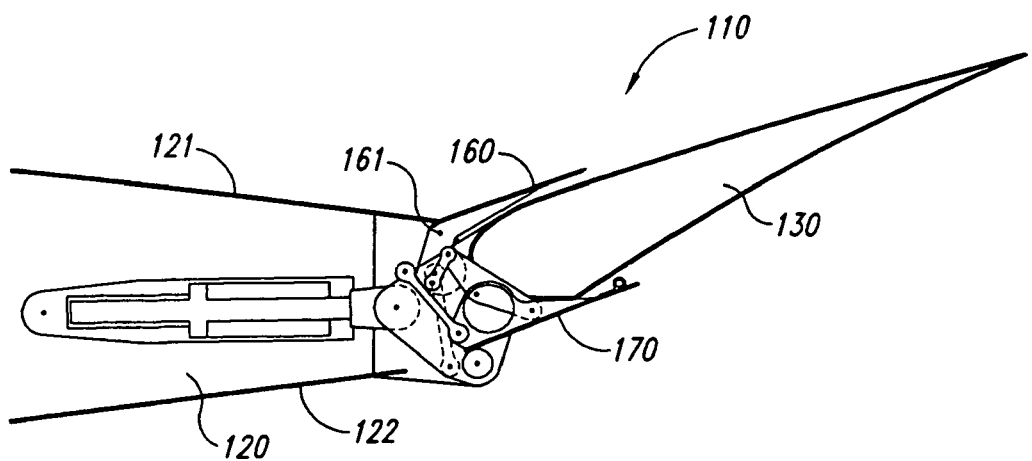

As shown in FIG. 2F, the second portion 130 can be deployed to further upward angles (e.g., about 30 degrees) to provide additional functionality for the airfoil 110. For example, in this setting, the second portion 130 can increase the drag and/or spoil the lift of the airfoil 110 and can accordingly be deployed to this setting upon landing to shorten the landing distance. The second portion 130 can also be deployed to the high drag/spoiler setting during flight to reduce airspeed and/or increase the aircraft rate of descent. In one aspect of this embodiment, the upper cove panel 160 and the lower cove panel 170 can continue to track the motion of the second portion 130. Although a gap may be opened in the lower flow surface 122 as the second portion 130 deploys upwardly, the upper cove panel 160 can seal or nearly seal the gap at the upper flow surface 121.

One aspect of an embodiment of the aircraft system 100 described above with reference to FIGS. 2A-2F is that the second portion 130 of the airfoil 110 can provide multiple functions, often at the same time. For example, the second portion 130 can be deployed upwardly or downwardly by a relatively small amount and at a relatively high frequency to provide high speed roll control. The second portion 130 can be deployed to these relatively low angles at a lower frequency to provide trim capability and/or spanwise variation in lift distribution for drag and/or load minimization, and/or trailing-wake vortex strength reduction. The second portion 130 can also be deployed to relatively high downward angles to provide high lift at low speed (e.g., a flap function), and can be deployed to relatively high upward angles to increase drag and/or destroy or limit lift (e.g., a spoiler function). One advantage of this arrangement is that an aircraft in accordance with an embodiment of the invention can include an airfoil 110 having at least one second portion 130 provides providing multiple functions that would otherwise require more devices. Another advantage is that the airfoil 110 can include multiple, similarly configured second portions 130, in contrast to existing arrangements which typically have different configurations for devices performing different functions.

Another feature of an embodiment of the aircraft system 100 described above with reference to FIGS. 2A-2F is that the lower hinge line 141 can be positioned at or near the lower flow surface 122, just external to the lower flow surface 122, or between the lower flow surface 122 and the upper flow surface 121. An advantage of this arrangement is that the guide structure 140 may require no external fairing (or a reduced size external fairing), thereby reducing the weight and complexity of the airfoil 110 while maintaining a relatively clean, low-drag configuration.

Still another feature of an embodiment of the aircraft system 100 described above with reference to FIGS. 2A-2F is that the lower cove panel 170 and the upper cove panel 160 can seal the interface between the second portion 130 and the first portion 120 when the second portion 130 is in its neutral position, and/or when the second portion 130 is deployed upwardly or downwardly by a relatively small amount. Accordingly, the drag of the airfoil 110 can be maintained at relatively low levels when the second portion 130 moves through relatively small excursions relative to its neutral position. As the second portion 130 deploys to high downward angles (e.g., as shown in FIGS. 2C-2D), the lower cove panel 170 and the upper cove panel 160 can open a gap 171 between the second portion 130 and the first portion 120 to better control the flow of air over both the first portion 120 and second portion 130 at such angles.

Yet another feature of an embodiment of the aircraft system 100 described above with reference to FIGS. 2A-2F is that the lower hinge line 141 can be positioned forward of the leading edge of the second portion 130. An advantage of this feature is that the second portion 130 can be deployed to substantial downward deflections. This feature, in combination with the cove panel features described above, enables the second portion 130 to maintain a smooth aerodynamic contour with the first portion 120 at some settings, and enables the second portion 130 to open the gap 171 at other settings.

Figure 3A:
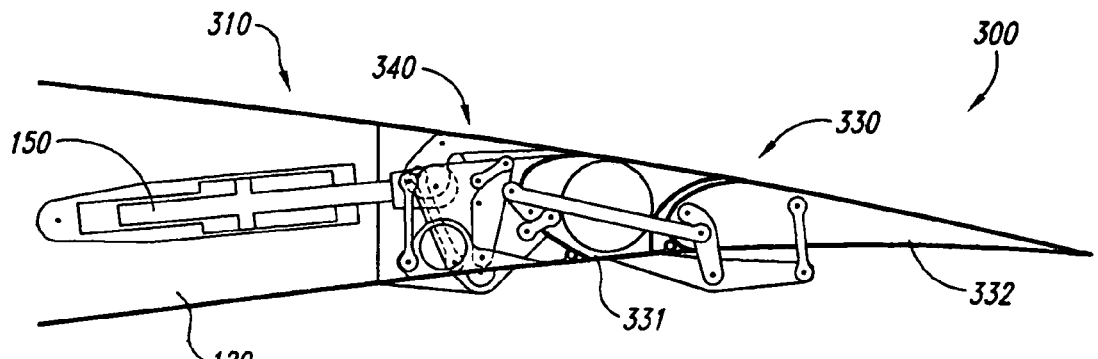
FIGS. 3A-3F illustrate partially schematic, cross-sectional views of an airfoil having a trailing edge portion with multiple slots in accordance with another embodiment of the invention.

FIGS. 3A-3F illustrate an aircraft system 300 that includes an airfoil 310 having a first portion 120 and a multi-element second portion 330 configured in accordance with another embodiment of the invention. Referring first to FIG. 3A, the second portion 330 can include a forward portion 331 positioned adjacent to the first portion 120, and an aft portion 332 positioned aft of the forward portion 331. A guide structure 340 couples the forward and aft portions 331, 332 to each other and to the first portion 120.

Figure 3B:
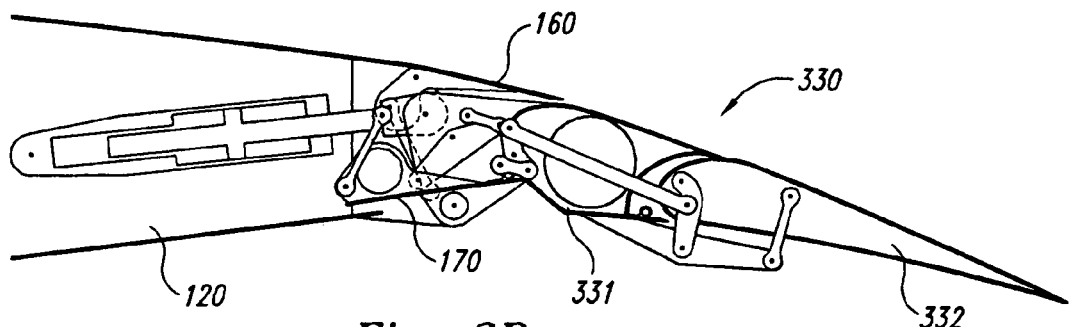
Figure 3C:
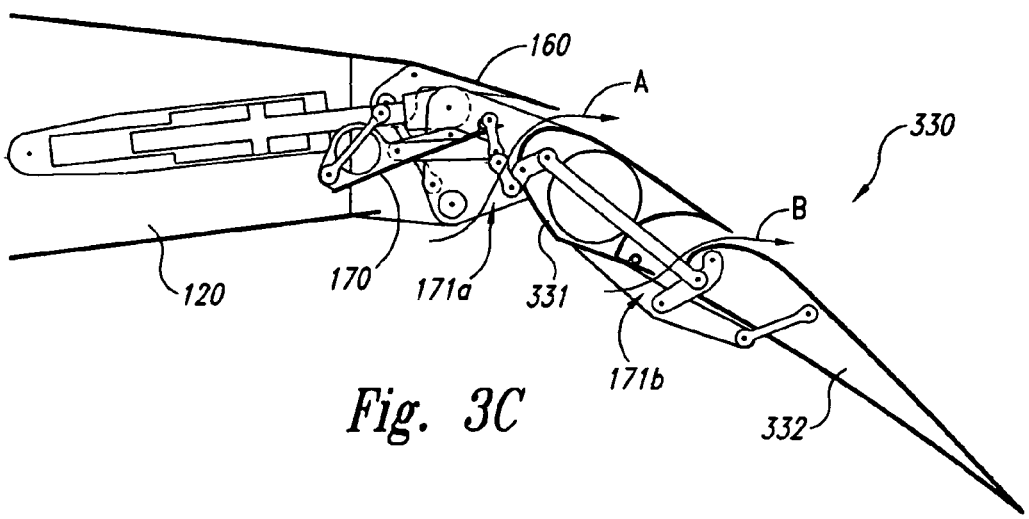
Figure 3D:
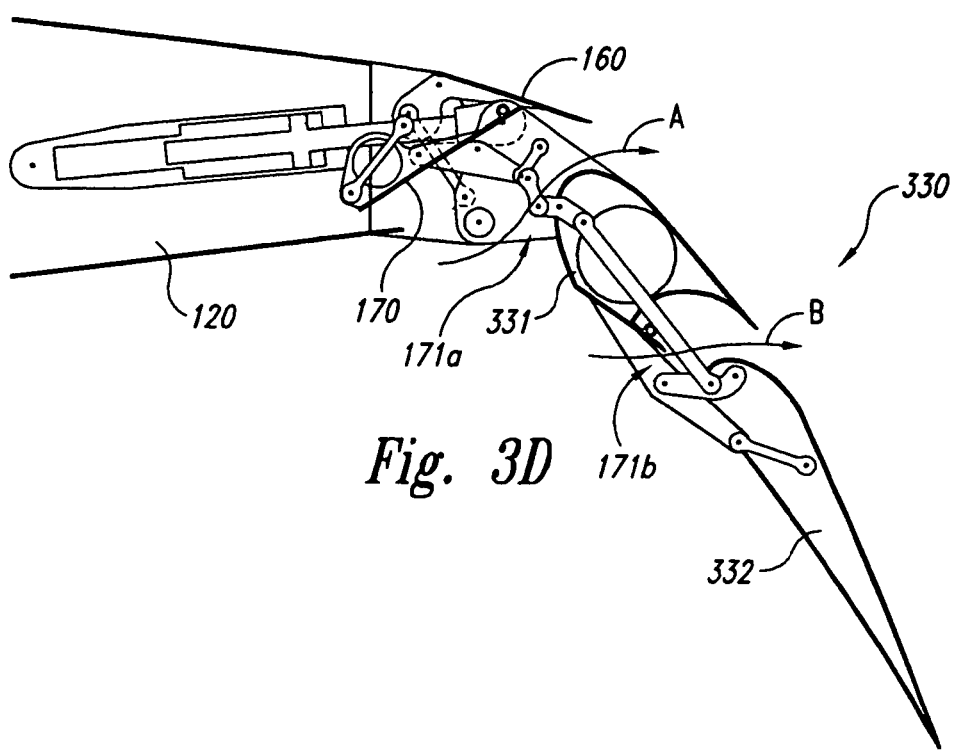

As the second portion 330 moves downwardly to relatively small deflection angles (as shown in FIG. 3B), the aft portion 332 and the forward portion 331 move relative to each other without opening a gap between them. The upper cove panel 160 can seal the gap that would otherwise form between the forward portion 331 and the first portion 120.

As the second portion 330 moves to more substantial downward deflections (shown in FIGS. 3C and 3D), a first gap 171a can open between the forward portion 331 and the first portion 120, and a second gap 171b can open between the aft portion 332 and the forward portion 331. Accordingly, a portion of the air flowing along the lower flow surface 122 can pass through the first gap 171a (as shown by arrow A) and a second portion can pass through the second gap 171b (as shown by arrow B).

Figure 3E:
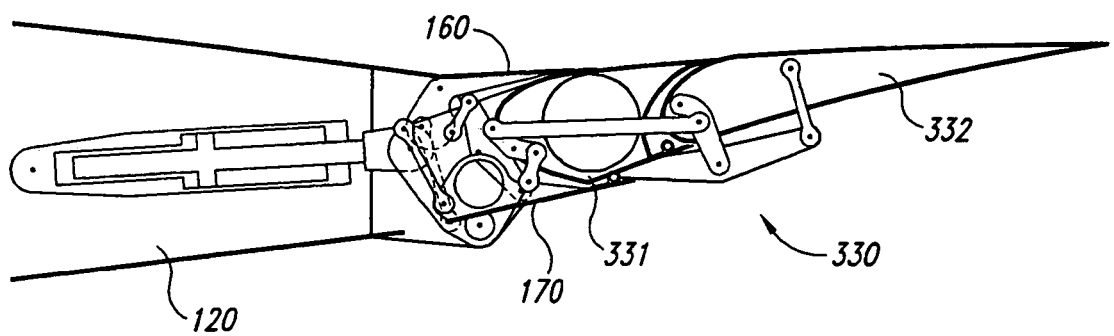
Figure 3F:
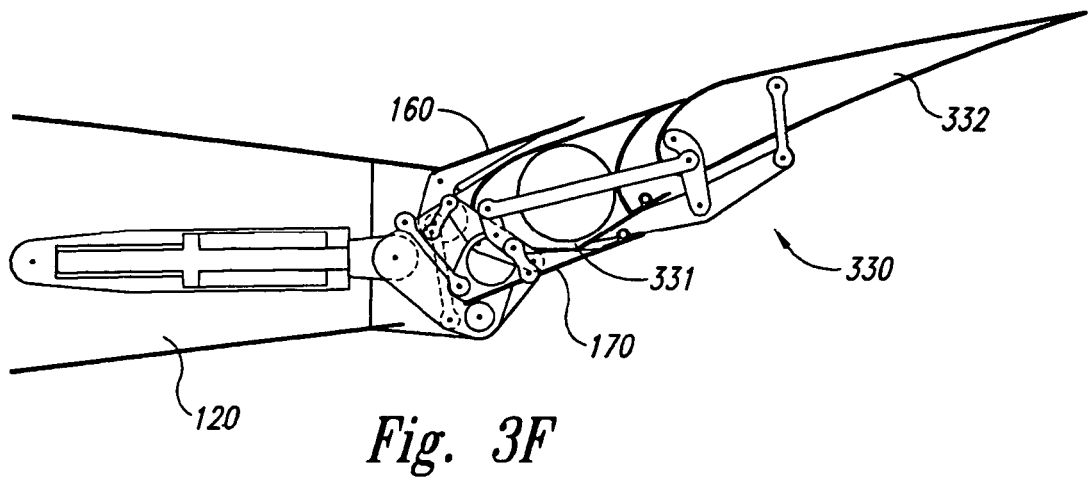

The second portion 330 can also be deflected upwardly to relatively small angles (as shown in FIG. 3E) and to more substantial angles (as shown in FIG. 3F). In at least the position shown in FIG. 3E, the gaps that would otherwise form between the forward portion 331 at the aft portion 332, and between the forward portion 331 and the first portion 120 can be sealed by the upper cove panel 160.

One feature of an embodiment of the airfoil 310 described above with reference to FIGS. 3A-3F is that the multi-element, double-slotted second portion 330 can in some cases more effectively control the airflow over the airfoil 310 at very high downward deflection angles, such as the angle shown in FIG. 3D. An advantage of this feature is that the second portion 330 can have an increased likelihood of maintaining high levels of lift at the high deflection angles.

Another feature of an embodiment of the airfoil 310 shown in FIGS. 3A-3F is that the portion of the guide structure 340 connecting the forward portion 331 to the first portion 120 can be identical to or at least generally similar to the guide structure 140 described above with reference to FIGS. 2A-2F. Accordingly, the guide structure 340 can have a substantial degree of commonality with guide structures 140 used to control the motion of single element second portions, such as the second portion 130 described above with reference to FIGS. 2A-2F. An advantage of this arrangement is that the cost of manufacturing and maintaining both single element second portions 130 and double element second portions 330 can be reduced when compared with existing arrangements, due to the common features shared by the guide structures 140, 340. Further details of the guide structure 340 are described below with reference to FIGS. 4A-4D.

FIGS. 4A-4D described aspects of the guide structure 340. For purposes of illustration, each Figure focuses on a portion of the guide structure 340 shown in solid lines, with other portions shown in phantom lines. Referring now to FIG. 4A, the first portion 120 can include a fixed panel 123 and the second portion 330 can include a driven panel 334. The actuator 150 can be coupled to the fixed panel 123, and the actuator arm 151 can be pivotably coupled to the driven panel 334 at a pivot point 152a. As the actuator arm 151 moves axially (indicated by arrow D), the driven panel 334 and the second portion 330 rotate about the lower hinge line 141 (indicated by arrow C). In one embodiment, the actuator 150 can include a hydraulically, pneumatically and/or electrically driven device. In a further aspect of this embodiment, the actuator 150 can be one of two or more actuators coupled to the second portion 330 to provide for redundancy in case one actuator fails. In another embodiment, a single actuator 150 can be coupled to the second portion 330, and in a particular aspect of the embodiment, the single actuator can have a configuration generally similar to one or more of those disclosed in pending U.S. application Ser. No. 10/454, 417 filed Jun. 3, 2003 and incorporated herein in its entirety by reference.

In one embodiment, the second portion 330 includes an aft torque tube 133a or other spar arrangement to provide for stiffness in the plane perpendicular to the plane of FIG. 4A. The upper cove panel 160 can include an upper torque tube 133b, and the lower cove panel 170 can include a lower torque tube 133c to provide stiffness for the upper cove panel 160 and the lower cove panel 170, respectively. The actuation of the upper cove panel 160 and the lower cove panel 170 are described below with reference to FIGS. 4B-4C.

Referring now to FIG. 4B, the upper cove panel 160 can be rigidly connected to a first upper panel link 162a. The first upper panel link 162a can pivot relative to the fixed panel 123 about a pivot point 152b. A second upper panel link 162b can be pivotably connected between the first upper panel link 162a and the driven panel 334 at pivot points 152*d* and 152*c*, respectively. Accordingly, the upper cove panel 160 can move relative to the first portion 120 in the manner described above with reference to FIGS. 2A-3F.

Referring now to FIG. 4C, the lower cove panel 170 can include a first lower panel link 172*a* that is in turn pivotably coupled to a second lower panel link 172*b* and a third lower panel link 172*c* at pivot points 152*g* and 152*h*, respectively. The second lower panel link 172*b* can be pivotably coupled to the fixed panel 123 at a pivot point 152*e*. The third lower panel link 172*c* can be pivotably coupled to the first panel 123 at pivot point 152*f* and to a fourth lower panel link 172*d* at a pivot point 152*i*. The fourth lower panel link 172*d* can be pivotably coupled to the driven panel 334 at a pivot point 152*j*. Accordingly, the lower cove panel 170 can move relative to the first portion 120 as described above with reference to FIGS. 2A-3F.

In one embodiment, the foregoing structures described above with reference to FIGS. 4A-4C can be common to both the multi-element second portion 330 shown in these Figures, and the single element second portion 130 described above with reference to FIGS. 2A-2F. When the second portion 330 includes an aft portion 332 and a forward portion 331 (referring now to FIG. 4D), a first aft link 135*a* pivotably coupled between the fixed panel 123 and a second aft link 135*b*. The second aft link 135*b* can be pivotably coupled to the driven panel 334, and can be pivotably coupled to a third aft link 135*c*. The third aft link 135*c* can be pivotably coupled to a fourth aft link 135*d*, which is in turn pivotably coupled between the forward portion 331 (e.g., the driven panel 334) and the aft portion 332. A fifth aft link 135*e* is also pivotably coupled between the forward portion 331 and the aft portion 332. Accordingly, the aft portion 332 can move relative to the first portion 331 as the second portion 330 moves in the manner described above with reference to FIGS. 3A-3F.

Figure 5:
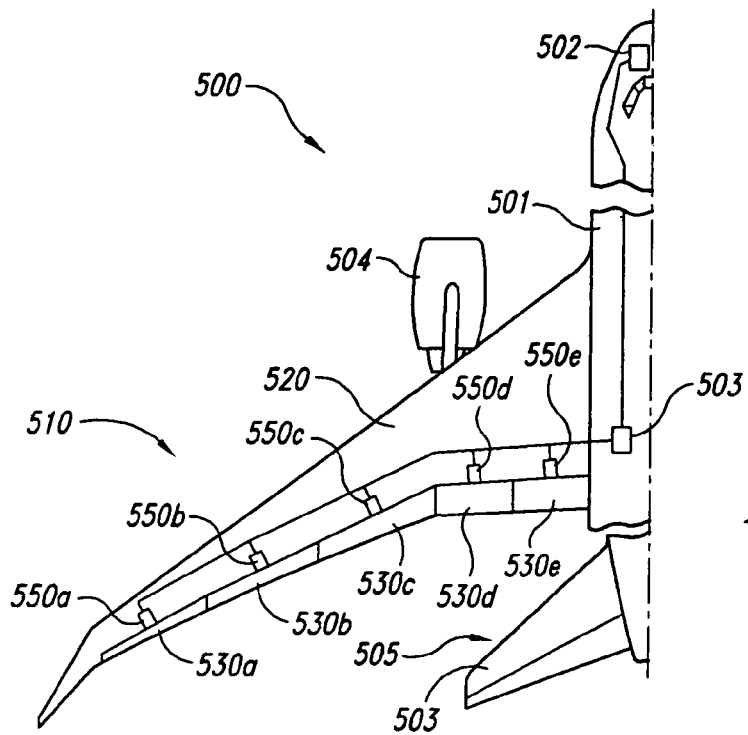
FIG. 5 illustrates an aircraft system that includes a wing having multiple trailing edge portions configured in accordance with an embodiment of the invention.

FIG. 5 is a partially schematic, top plan view of an aircraft system 500 that includes an airfoil or wing 510 having features generally similar to those described above, connected to a fuselage 501 having a tail or empennage 505 (with horizontal stabilizers 503), and a propulsion system 504. In one aspect of this embodiment, the wing 510 can include a leading edge portion 520 and a plurality of trailing edge portions 530 (five are shown in FIG. 5 as trailing edge portions 530*a*-530*e*). In one embodiment, the wing 510 can have a swept leading edge and upwardly canted tips and in another embodiment, the wing 510 can have a straight leading edge, and/or flat tips. In still another embodiment, the tail 505 can be eliminated. In one embodiment, the trailing edge portions 530 can extend across the entire span of the wing 510, and in other embodiments, the trailing edge portions can extend across less than the entire span. In one embodiment, each trailing edge portion 530 can include a dedicated actuator 550 (shown in FIG. 5 as actuators 550*a*-550*e*). Each of the actuators 550 can be coupled to a controller 503. The controller 503 can in turn be coupled to pilot controls 502 (shown schematically in FIG. 5) which can include foot pedals, a stick, and/or a yoke or an automatic flight computer.

As the pilot inputs a command via the pilot controls 502, the controller 503 can automatically direct the appropriate actuator 550 to move its corresponding trailing edge portion 530 in the appropriate manner. For example, during landing approach, some of the trailing edge devices 530 (e.g., devices 530*d*, 530*e*) can be deployed to high lift or flap settings to increase the lift of the aircraft system 500. In other embodiments, all of the trailing edge devices 530*a*, 530*e* can be deployed to a flap setting. Upon landing, some or all of the trailing edge devices 530*a*, 530*e* can be deployed upwardly to high drag or spoiler settings. During low speed flight, one or more of the outboard trailing edge devices (e.g., devices 530*a*-530*c*) can be deployed upwardly or downwardly to provide roll control functionality, and during high speed flight, one or more of the more inwardly positioned trailing edge devices (e.g., devices 530*b*-530*e*) can be deployed in a similar manner. During call control, trailing edge devices 530 on the left and right wings of the aircraft system 500 can be deployed asymmetrically to produce rolling movements. During any flight regime, one or more of the trailing edge devices 530 can be deployed upwardly or downwardly to trim the wing 510 (e.g., to provide an overall lift characteristic) or, the trailing edge devices 530 can be selectively deployed to different settings to control the manner in which lift is distributed over the span of the wing 510. Further details of these arrangements are described below with reference to FIGS. 6A-6G.

Figure 6A:
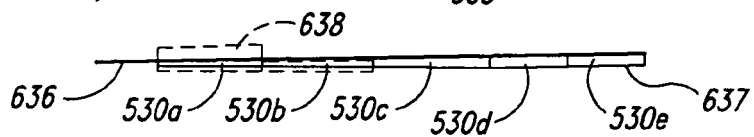
FIGS. 6A-6G illustrate the wing shown in FIG. 5 with the trailing edge portions deployed to a variety of positions in accordance with embodiments of the invention.
Figure 6B:
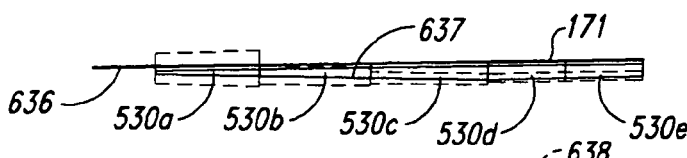

FIGS. 6A-6G are schematic illustrations of the trailing edge devices 530 deployed in a variety of combinations depending upon the flight condition of the aircraft system 500 (FIG. 5). In each of FIGS. 6A-6G, solid line 636 represents the neutral position for each trailing edge device 530, solid line 637 represents a steady state deflected position for each trailing edge device 530, and phantom lines 638 represent time-varying deflections of each of the trailing edge devices 530. Referring first to FIG. 6A, during normal takeoff, the outboard trailing edge devices 530*a*, 530*b* can be deflected in a time-varying manner upwardly and/or downwardly to provide low speed roll control, while the inboard trailing edge devices 530*c*-530*e* can be deflected to a fixed downward flap setting. For short takeoff (as shown in FIG. 6B) all the trailing edge devices 530 can be deployed to a flap setting at which a gap 171 opens between each trailing edge device 530 and the leading edge 520. Each of the trailing edge devices 530 can also deflect in a time-varying manner to provide for roll control. In each of the configurations shown in FIGS. 6A and 6B, the positions of the trailing edge devices 530 can be tailored to reduce drag for a given level of lift.

Figure 6C:
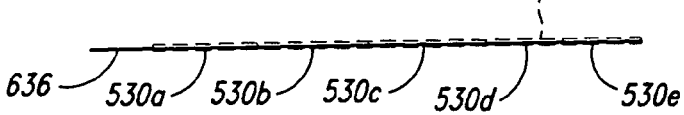

During cruise (as shown in FIG. 6C) each of the trailing edge devices 530 can be moved to its neutral position and can be moved slightly upwardly or downwardly for example, for local trim, optimum cruise loading, and/or load alleviation. The trim capability can also be used in other flight regimes. For example, the trim capability can be used to shift aerodynamic loads inboard during take-off of a heavily loaded aircraft, or during a dive. In particular embodiments, the trim capability can be used not only to tailor the spanwise loading of the wing 510, but also to trim the pitch and roll attitude of the aircraft system 500. A result of these features is that the need for shifting fuel within the wing 510 can be reduced, the downward load on the horizontal stabilizers 503 can be reduced, trailing wake vortices can be controlled, and the overall wing loading distribution can more closely approximate an optimal load, both spanwise and chordwise. By tailoring the chordwise and/or spanwise load distribution during flight, the aircraft drag (and accordingly fuel burn) can be continually reduced. By shifting loads from outboard to inboard (e.g., by deflecting outboard trailing edge portions up and inboard trailing edge portions down), the wing bending movements can be reduced. By cyclically shifting the spanwise center of lift, (e.g., by alternating inboard and outboard trailing edge deflections while maintaining overall lift), the wake vortex system of the wing may be reduced in strength.

Figure 6D:
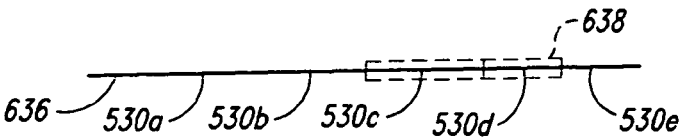
Figure 6E:
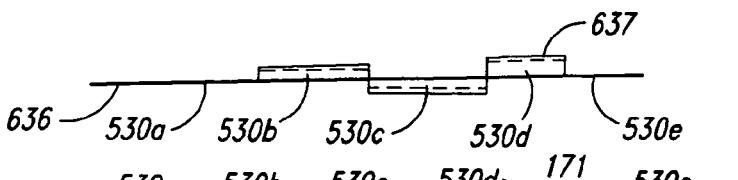
Figure 6F:
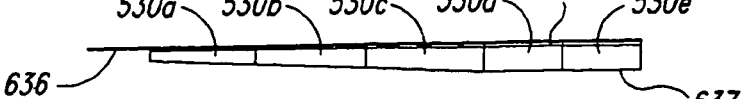
Figure 6G:
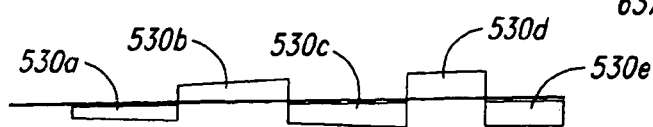
Figure 7:
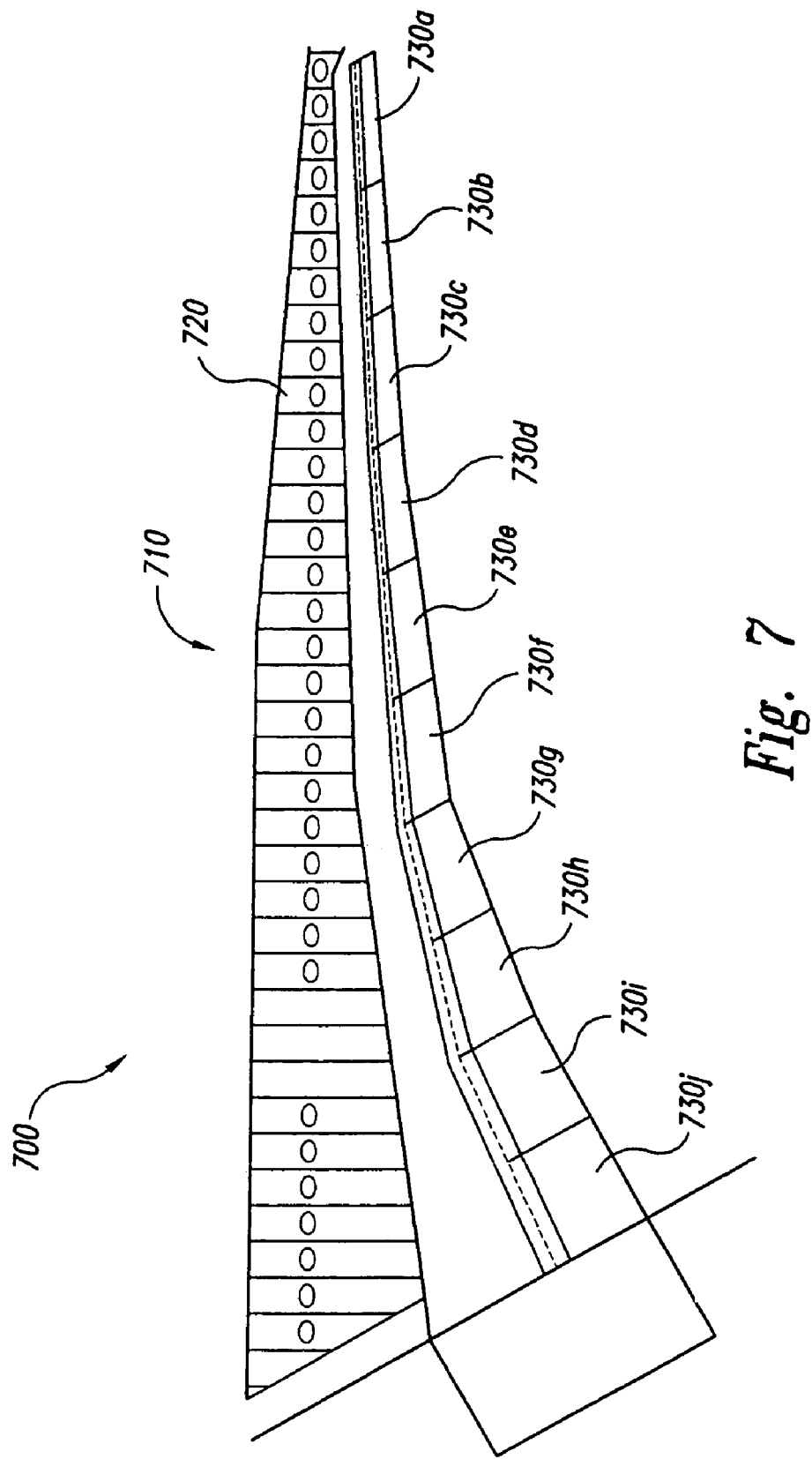
FIG. 7 illustrates an aircraft having a plurality of trailing edge portions configured in accordance with another embodiment of the invention.

Referring now to FIG. 6D, trailing edge devices 530c and 530d can be deployed upwardly and/or downwardly in a time-varying manner to provide roll control during high speed maneuvers. During descent, one or more of the trailing edge devices 530 can be deployed to a fixed upward or downward setting to increase drag (e.g., to provide a speed brake), as shown in FIG. 6E, while also deflecting in a time-varying manner to provide for roll control. Prior to landing, each of the trailing edge devices 530 can be deployed to a substantial downward flap setting (as shown in FIG. 6F), and can open the gap 171. The trailing edge devices 530 can also be selectively adjusted to control trailing edge vortices. In particular embodiments, the positions of the trailing edge devices 530 can be a function of aircraft angle of attack and/or can adjust the aircraft altitude as a function of aircraft speed. If the trailing edge devices 530 have more than one element, an additional gap can be opened between the elements, as described above with reference to FIGS. 3A-3F. Upon landing, the trailing edge devices 530 can be deployed upwardly and downwardly as shown in FIG. 6G to provide ground braking and lift spoiling. In another embodiment, all the trailing edge devices 530 can be deployed upwardly to increase the load of the aircraft landing gear.

In an embodiment described above with reference to FIGS. 5 and 6, the airfoil 510 includes five trailing edge devices. In other embodiments, the airfoil can include more or fewer trailing edge devices. For example, in an embodiment shown in FIG. 7, an aircraft system 700 includes an airfoil 710 having a leading edge portion 720 and ten trailing edge devices 730a-730j. In other embodiments, the airfoil 710 can include other numbers of trailing edge devices, for example, nine trailing edge devices. In any of these embodiments, the trailing edge devices can be operated according to the arrangements described above with reference to FIGS. 2A-6G.

In a particular aspect of the embodiments described above with reference to FIGS. 5-7, each of the trailing edge devices can be moved to high lift, high drag, roll, and trim settings. In other embodiments, fewer than all of the trailing edge devices can be moved to all of the above settings. For example, in a particular embodiment, the inboard-most trailing edge devices can be configured to operate at a relatively low rate, suitable for high lift, high drag and trim settings, and the outboard-most trailing edge devices can be configured to operate at a relatively high rate, suitable for roll control, and/or load alleviation in addition to performing high lift, high drag and trim functions. In a particular aspect of this embodiment, the different rates for different trailing edge devices can be obtained by coupling different actuators (or different size actuators) to different trailing edge devices, with or without maintaining mechanical similarity between the associated guide structures.

One feature of an embodiment of the aircraft systems described above with reference to FIGS. 5-7 is that the airfoil or wing can include a plurality of trailing edge devices. In a particular aspect of these embodiments, the trailing edge devices can perform multiple functions, often at the same time. In another aspect of these embodiments, the guide structures coupled to each of the trailing edges can be mechanically similar even though the size and/or location of the trailing edge device differs. For example, the inboard trailing edge device 730j can be located at a portion of the wing 710 having a fairly large depth, while the outboard trailing edge portion 730a can be located at a section of the wing 710 having a shallow depth. In each case, the mechanical arrangement coupling the trailing edge portion to the leading edge portion 720 can be geometrically similar (e.g., the angles between the guide structure linkages of one trailing edge portion at a given setting can be at least approximately the same as the angles between the corresponding linkages of another trailing edge device of the same setting). In a particular embodiment, the guide structure 140 (FIG. 2A) or 340 (FIG. 3A) can have at least approximately the same layout for each of the trailing edge portions 730a-730j, and can be scaled to account for the difference in wing depth across the span of the wing 710 and/or to account for differences in the loads experienced by each trailing edge device. In a further aspect of this embodiment, at least some of the trailing edge devices 730 can be coupled to identically configured guide structures.

An advantage of the foregoing arrangement is that the guide structures for different trailing edge portions can have some or all components in common. A further advantage is that even when at least portions of the guide structures are scaled relative to each other, the manner in which the guide structure is assembled and maintained can be common among these guide structures. As a result, the trailing edge devices can be simpler to install and maintain, as compared to existing trailing edge devices which typically have a wide variety of coupling arrangements.

Figure 8A:
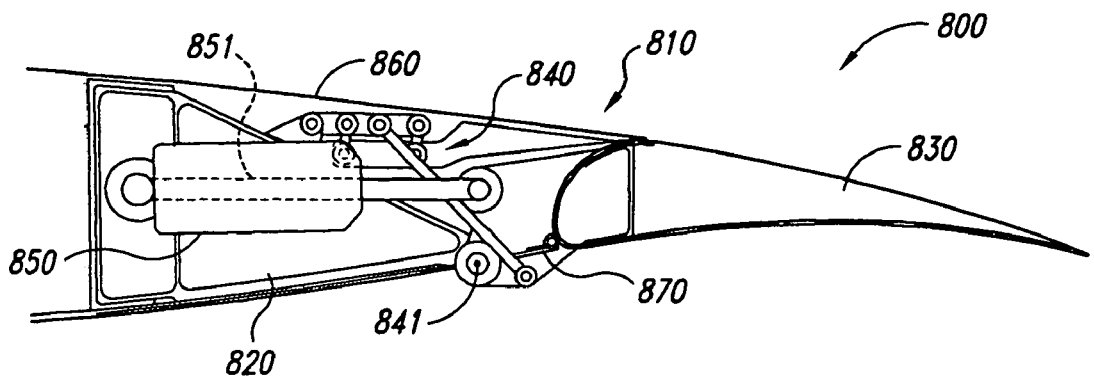
FIGS. 8A-8C illustrate partially schematic, cross-sectional views of an airfoil having a trailing edge portion with a flexible panel configured in accordance with another embodiment of the invention.
Figure 8B:
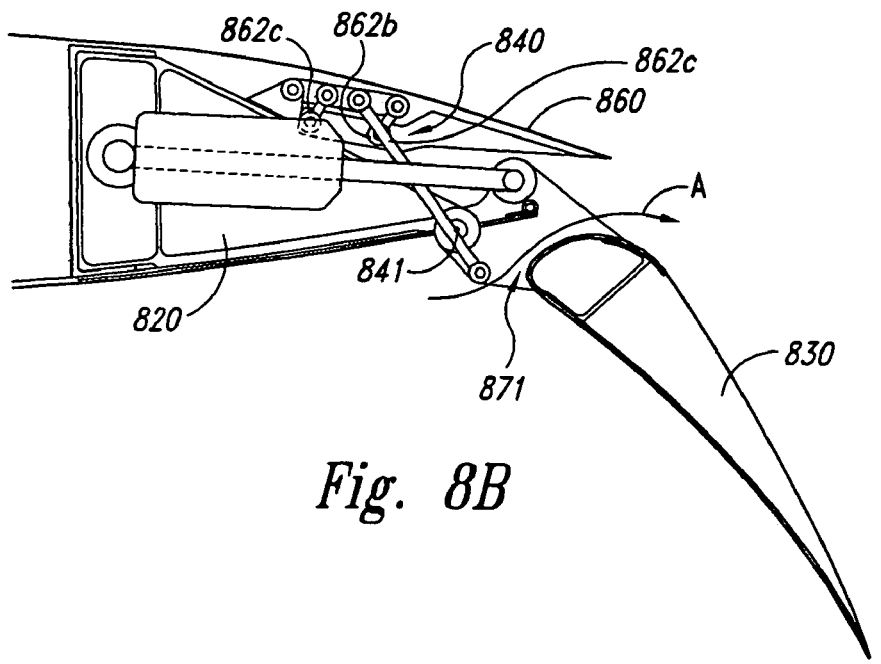
Figure 8C:
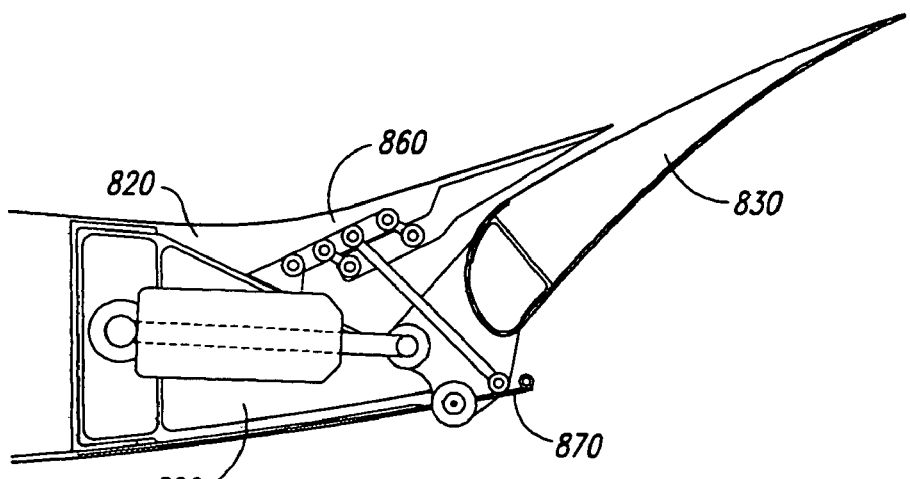

FIGS. 8A-8C are schematic illustrations of an aircraft system 800 having an airfoil 810 configured in accordance with another embodiment of the invention. In one aspect of this embodiment, the airfoil 810 includes a first portion 820 and a second portion 830 that is movable relative to the first portion 820. Accordingly, the airfoil 810 can include an actuator 850 having an actuator arm 851 that moves the second portion 830 relative to the first portion 820. A guide structure 840 can control the motion of the second portion 830 relative to the first portion 820. In one aspect of this embodiment, the second portion 830 can pivot relative to the first portion 820 about a lower hinge line 841. The airfoil 810 can further include a fixed lower panel 870 and a flexible upper panel 860. As described below with reference to FIGS. 8B-8C, the flexible upper panel 860 can bend or flex as the second portion 830 moves relative to the first portion 820.

Referring now to FIG. 8B, the second portion 830 can be deflected downwardly to open a gap 871 through which air can flow as indicated by arrow A. In another embodiment, the second portion 830 can have a double-slotted configuration generally similar to that described above with reference to FIGS. 3A-3F and can accordingly open two gaps. In either embodiment, the flexible upper panel 860 can also move downwardly and can contact the second portion 830 for small deflections while allowing the gap 871 to open at larger deflections. Accordingly, the flexible upper panel 860 can be operatively coupled to the second portion 830 with the guide structure 850. In one aspect of this embodiment, the guide structure 840 can include upper panel links 862a, 862b, and 862c that pivot to reversibly bend the flexible upper panel 860 downwardly in a convex manner as the second portion 830 moves relative to the first portion 820. These same links can bend the flexible upper panel 860 in a concave manner (as shown in FIG. 8C) as the second portion 830 deflects upwardly from its neutral position. In one embodiment, the flexible upper panel 860 can include aluminum and/or titanium. In other embodiments, the flexible upper panel 860 can include other resilient bendable materials, for example, plastics or metal/plastic composite materials. In any of these embodiments, the flexible upper panel 860 can completely seal or at least approximately seal (as shown in FIG. 8C) against the second portion 830.

One feature of an embodiment of the arrangement shown in FIGS. 8A-8C is that the fixed lower panel 870 and the flexible upper panel 860 can be relatively simple to install and maintain as they have relatively few moving parts. Accordingly, the cost for fabricating and maintaining the aircraft system 800 can be reduced when compared to other systems. Another feature of an embodiment of the arrangement shown in FIGS. 8A-8C is that the flexible upper panel 860 can provide a smooth aerodynamic surface at some settings of the second portion 830, while allowing an aerodynamically beneficial gap to open at other settings. As described above, this arrangement can improve the overall aerodynamic efficiency of the airfoil 810.

Still another feature of an embodiment of the arrangement shown in FIGS. 8A-8C is that deploying the flexible panel 860 downwardly as the second portion 830 deploys downwardly tends to shift the hinge line 841 forward and up. An advantage of this arrangement is that as the hinge line 841 moves up, the requirement for a fairing to accommodate the guide structure 840 can be eliminated or, in another embodiment, the arrangement can include a fairing having a much smaller size than that of existing flap track fairings. As a result, the overall drag and fuel consumption of the aircraft system 800 can be reduced.

From the foregoing, it will be appreciated that specific embodiments of the invention have been described herein for purposes of illustration, but that various modifications may be made without deviating from the spirit and scope of the invention. For example, several embodiments of the invention have been described in the context of wings. In other embodiments, trailing edge devices having generally similar characteristics can be applied to other airfoils, including canards, tails, blended wing/bodies, flying wings and rotary wings. In still further embodiments, the trailing edge devices can be applied to systems other than aircraft systems, for example, submarines or other mobile systems having hydrodynamic surfaces, or to stationary systems having aerodynamic or hydrodynamic surfaces. In further embodiments, the maximum upward and/or downward deflections of the trailing edge devices can have values other than those described above. Accordingly, the invention is not limited except as by the appended claims.

We claim:

1. A system, comprising:
    a first portion of an external fluid flow body having a first flow surface and a second flow surface facing opposite from the first flow surface;
    a second portion of the external fluid flow body, at least part of the second portion being positioned aft of the first portion, the second portion being pivotable relative to the first portion about a pivot axis that is positioned at the second flow surface or between the first and second flow surfaces so as to move relative to the first portion between a neutral position with the second portion generally aligned with the first portion, a plurality of first positions with the second portion deflected in a first direction relative to the neutral position, and a plurality of second positions with the second portion deflected in a second direction opposite the first direction relative to the neutral position;
    a flexible surface positioned proximate to the first and second portions, the flexible surface having a first shape when the second portion is in the neutral position, a second shape when the second portion is in at least one of the first positions, and a third shape when the second portion is in at least one of the second positions, a gap being positioned between the flexible surface and the second portion when the second portion is in at least one of the second positions;
    a guide structure coupled between the first and second portions; and
    an actuator operatively coupled between the first and second portions to move the second portion relative to the first portion.

2. The system of claim 1, further comprising a controller coupled to the actuator, the controller being configured to direct to the actuator to move the second portion to a high lift setting, a high drag setting, a roll setting and a trim setting.

3. The system of claim 1 wherein the second portion is one of a plurality of second portions and wherein the plurality of second portions extends spanwise from a position at least proximate to an inboard extremity of the external fluid flow body to a position at least proximate to an outboard extremity of the external fluid flow body.

4. The system of claim 1 wherein the second portion is one of from five to ten second portions, each being movable relative to the first portion between a neutral position, a plurality of upward positions and a plurality of downward positions.

5. The system of claim 1 wherein the second positions are downwardly deflected positions, and wherein a gap is exposed between the flexible surface and the second portion of the external fluid flow body when the second portion is in at least one of the downwardly deflected positions.

6. The system of claim 1 wherein the second portion includes a forward portion and an aft portion and wherein the aft portion is movable relative to the forward portion to expose a gap between the forward and aft portions.

7. The system of claim 1 wherein the second portion at least partially seals against the flexible surface when the second portion is in at least one of the second positions.

8. The system of claim 1 wherein the second portion includes a leading edge and wherein the second portion is pivotable relative to the first portion about a pivot axis that is positioned forward of the leading edge.

9. The system of claim 1 wherein the second flow surface does not include a fairing positioned to house at least one of the guide structure and the actuator.

10. The system of claim 1 wherein the external fluid flow body includes an airfoil, and wherein the first positions are upwardly deflected positions, and wherein the second positions are downwardly deflected positions.

11. The system of claim 1 wherein the guide structure includes a plurality of links pivotably coupled between the actuator and the flexible surface.

12. The system of claim 1 wherein the actuator is the only actuator coupled between the first and second portions.

13. The system of claim 1 wherein the first and second portions include first and second portions of a first wing and wherein the system further comprises:
    a second wing;
    a fuselage positioned between the first and second wings; and
    a tail depending from the fuselage.

14. A system, comprising:
    a first portion of an external fluid flow body having a first flow surface and a second flow surface facing opposite from the first flow surface;
    a second portion of the external fluid flow body, at least part of the second portion being positioned aft of the first portion, the second portion being movable relative to the first portion between a neutral position with the second portion generally aligned with the first portion, a plurality of first positions with the second portion deflected in a first direction relative to the neutral position, and a plurality of second positions with the second portion deflected in a second direction opposite the first direction relative to the neutral position;

a flexible surface positioned proximate to the first and second portions, the flexible surface having a first shape when the second portion is in the neutral position, a second shape when the second portion is in at least one of the first positions, and a third shape when the second portion is in at least one of the second positions, a gap being positioned between the flexible surface and the second portion when the second portion is in at least one of the second positions;

a guide structure coupled between the first and second portions; and an actuator operatively coupled between the first and second portions to move the second portion relative to the first portion, wherein the second flow surface does not include a fairing positioned to guide air around at least one of the guide structure and the actuator.

* * * * *